United States Patent
Antonenko

[15] 3,678,312
[45] July 18, 1972

[54] WINDING OF ALTERNATING CURRENT ELECTRIC MACHINE

[72] Inventor: Anatoly Ivanovich Antonenko, Kiev, U.S.S.R.

[73] Assignee: Institut Elektrodinamiki Akademii Nauk Ukrainskoi SSR, Kiev, U.S.S.R.

[22] Filed: Feb. 24, 1971

[21] Appl. No.: 118,305

[52] U.S. Cl. ............................................ 310/185, 310/195
[51] Int. Cl. .......................................................... H02k 3/00
[58] Field of Search ........................................... 310/185, 195

[56] References Cited

UNITED STATES PATENTS

| | | |
|---|---|---|
| 952,113 | 3/1910 | Hawkins ............................ 310/185 X |
| 2,267,805 | 12/1941 | Appleman ........................... 310/195 X |

Primary Examiner—D. X. Sliney
Attorney—Waters, Roditi, Schwartz & Nissen

[57] ABSTRACT

The invention relates to a winding of an alternating current electric machine combining the functions of two windings having a different number of poles which comprises coils forming branches and distributed on a magnetic core. Some ends of these coils are connected to the terminals corresponding to one number of poles $P_1$ and the other ends thereof are connected to the terminals corresponding to the other number of poles $P_2$. At least one of said branches is made of at least two coils, the angle between the axis of which is approximately multiple to $2\pi/(P_1+P_2)$ radians, while the number of turns of one coil of the branch is proportional to the sine of the angle between the axis of the other coil and the axis of the same branch in electrical degrees.

4 Claims, 13 Drawing Figures

FIG. 2a
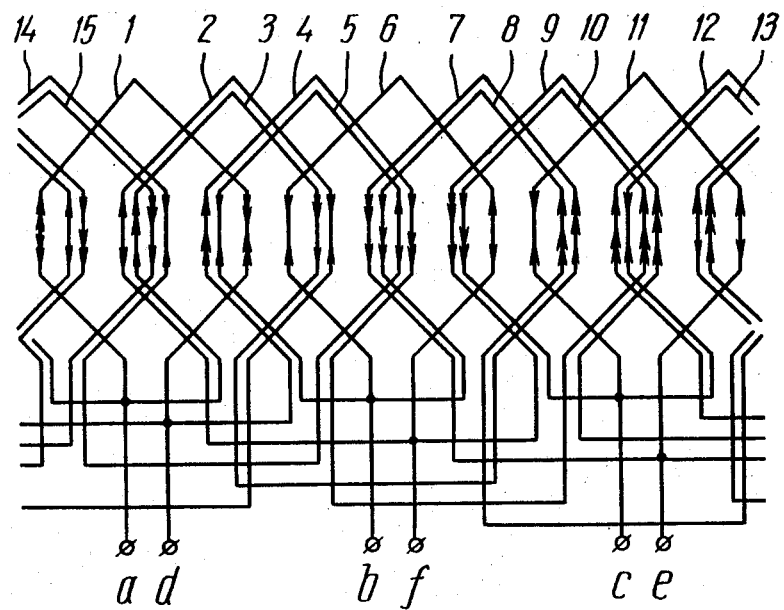
FIG. 2b
FIG. 2c
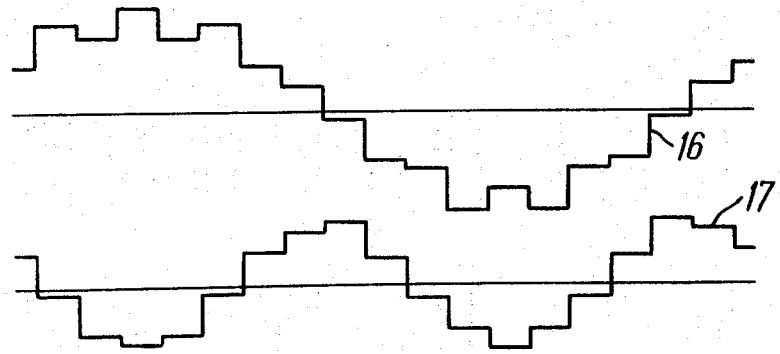

WINDING OF ALTERNATING CURRENT ELECTRIC MACHINE

The present invention relates to alternating current electric machines and, more particularly, the invention relates to windings of alternating current electric machines.

Known in the art are windings of alternating current electric machines combining the functions of two windings with a different number of poles comprising coils distributed on a magnetic core and forming branches between the terminals corresponding to one and another number of pairs of poles $P_1$ and $P_2$. The branches having ends connected to the terminals corresponding to one number of poles have the other ends connected to the other terminals corresponding to the other number of poles.

The known windings, when fed with an a.c. voltage corresponding to one of the numbers of poles results, are disadvantageous in appearance of equalizing currents which may come up to the values exceeding the rated current. The appearance of equalizing currents in the known windings is specified by the fact that the resultant axes of the branches connected in parallel do not coincide. This makes the known windings unsuitable for pole-changing motors.

An object of the present invention is to eliminate the above-mentioned disadvantage.

The main object of the invention is to provide a winding for an electric machine which insures elimination of the equalizing currents in the parallel branches of the winding fed by an alternating current through the terminals corresponding both to one and another number of poles due to respective selection of effective number of turns and mutual disposition of the coils of the parallel branches. Another object of the invention is to provide more complete utilization of the active materials of the pole-changing motors due to the use of a different number of coils at each speed of the motor.

These objects are accomplished due to the fact that in the winding of an electric machine at least one branch is made of at least two coils, the angle between the axes of which is approximately multiple to $2\pi/(P_1+P_2)$ radians, while the number of turns of one coil of said branch is proportional to the sine of the angle between the axis of the other coil and the axis of the same branch in electrical degrees.

The winding is preferable provided with additional coils combined into groups permanently connected to the terminals corresponding to one of the numbers of turns, in which case each group is preferably provided with coils spaced from each other for a distance approximately equal to the integral number of pole divisions at the same number of poles.

The groups of additional coils in the windings of pole-changing motors designed for operation at a constant moment are preferably connected to the terminals corresponding to a lower number of poles in parallel to the winding, while in the windings of motors designed for operation at constant power these groups are preferably connected to the terminals corresponding to a greater number of poles, in series with the winding.

The use of the proposed winding in pole-changing motors allows simpler switching equipment to be employed.

The proposed winding provides for simultaneous power supply through the terminals corresponding to different number of poles and this makes it possible to use this winding in non-contact converters, non-contact electric machine a.c. amplifiers and in other devices employing two windings with different numbers of poles. The application in these devices of the proposed winding instead of two windings for different number of poles permits the power of these devices to be increased without losses of energy or any increase in their overall dimensions.

Other objects and advantages of the invention will be apparent from the following detailed description of some embodiments of the invention, reference being made to the accompanying drawings, in which:

FIG. 2 shows an extended diagram of the winding having a pole number ratio of 4:2 and diagrams of the magnetomotive force;

Figure 1:
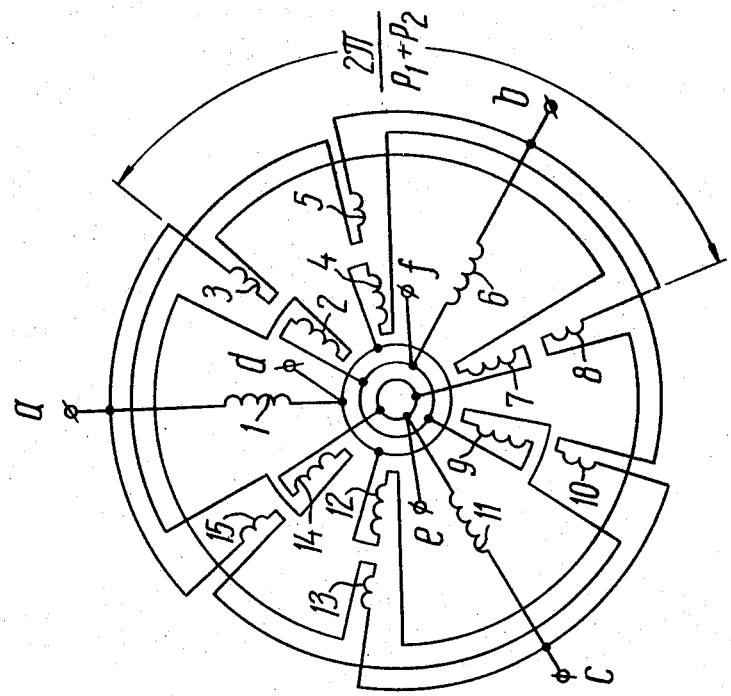
FIG. 1 shows a diagram of connection of the coils of a winding having a pole number ratio of 4:2.

The proposed modification of the winding having a ratio of numbers of poles of 4:2 (FIGS. 1 and 2) comprises a magnetic core on which are distributed coils 1–14 forming branches $a$–$d$, $a$–$e$, $a$–$f$, $b$–$d$, $b$–$e$, $b$–$f$, $c$–$d$, $c$–$e$, $c$–$f$, some ends of which are connected to terminals $a$, $b$, $c$ corresponding to one number of poles ($2p_1=2$) and the other ends are connected to terminals $d$, $e$, $f$ corresponding to the other number of poles ($2p_2=4$). The terminals $a$, $b$, $c$ or $d$, $e$, $f$ corresponding to one number of poles are zero points of the circuit corresponding to the other number of poles.

A distinctive feature of the invention according to the proposed invention consists in the fact that the angle between the axes of the series connected coils of the branches is approximately multiple to $2\pi/(P_1+P_2)$ radians. Thus, for example, the coils 3 and 7 of the branch $a$–$e$ of the winding having a number of pairs of poles $P_1=1$ and $P_2=2$ (FIGS. 1 and 2) are located at a distance of $\frac{2}{3}\pi$ radians, i.e., 120°. Another distinctive feature of the winding according to the invention is that the number of turns of one coil of the branch $a$–$e$ (or $a$–$f$, $b$–$d$, $b$–$e$, $c$–$d$, $c$–$x$) is proportional to the sine of the angle between the axis of the other coil and the axis of this branch in electrical degrees. In this case the proportionality factor is equal to $1\alpha/(\sin \text{Pi})$ where $\alpha$ is an angle between the axes of the coils under consideration and Pi is a number of pairs of poles which is used for calculation of the electrical degrees.

Thus, for example, the axis of the coil 3 forms an angle with the axis of the branch $a$–$e$ equal to 40 electrical degrees (relative to the field having a number of pair of poles $P_1=1$), whereas the axis of the coil 7 forms an angle of 160 electrical degrees. According to the above, the number of turns of the coil 3 is equal to sin 160°/sin 120° = 0.395 while the number of turns of the coil 7 is equal to sin 40°/sin 120° = 0.742.

The effective number of turns of the branch is taken for unity.

Relative to the field having a number of pairs of poles $P_2=2$, the axis of the branch $a$–$e$ under consideration has a coordinate of 120° (the terminal is fed with a voltage having a phase of 120°).

In this case the axis of the coil 3 forms an angle with the axis of the branch $e$–$a$ equal to 80°–120° = –40 electrical degrees, while the axis of the coil 5 form an angle therewith equal to 320°–120° = 200 electrical degrees.

By using the same technic, determine the numbers of turns of the coils:

for the coil 3: sin 200°/sin 120°·2 = 0.395, for the coil 7: sin (–40°)/sin 120°·2 = 0.742

The above example indicates that the numbers of turns of the winding coils are determined as single valued irrespective of the number of turns selected during the calculation.

In this case, if the axis of one coil coincides with the axis of the branch (the coil 1, FIGS. 1,2) its number of turns is equal to $\sin\alpha/\sin\alpha = 1$, while the number of turns of the other coil is equal to sin 0/sin $\alpha = 0$, i.e., such branches contain only those coils whose axes coincide with the axis of the branch.

The above-described version of the winding at a ratio of the number of turns of the poles of 4:2 can be made at an amount of slots multiple to 18. In this case the process of making such a winding is the same as in the case of making single-layer windings.

When feeding the above-described winding with a three-phase current through the terminals $a,b,c$, there appears a two-pole rotating magnetic field, while when feeding the winding through the terminals $d,e,f$, a four-pole rotating magnetic field appears. Shown in FIG. 2 is a diagram 16 of a two-pole magnetomotive force for a moment of time when the current applied to the terminal $a$ is maximum, and also a diagram 17 of a four-pole magnetomotive force for a time moment when the current applied to the terminal $d$ is maximum.

It is clear that the number of poles is changed without any reconnection in the winding circuit, but solely due to connection to the power mains of the respective terminals ($a,b,c$ or $d,e,f$). The modification of the proposed winding having a number-of-pole ratio of 6:4 (FIGS.3,4) includes coils 18–41 forming branches a–d, a–e, a–f, b–d, b–e, b–f, c–d, c–e, c–f, a–o, b–o, c–o having some ends connected to the terminals $a,b,c$ corresponding to one number of poles ($2P_{1\,1} = 4$) and having other ends connected to the terminals $d,e,f$ corresponding to the other number of poles ($2P_2 = 6$). Similarly to the above-described version of the winding, this modification contains branches consisting of two coils spaced at a distance approximately equal to $2\pi/(P_1 + P_2)$ radians. For example, in the coils 19 and 39 (FIGS. 3 and 4) the branches c–f are located at a distance only for 4.17 percent higher than $2\pi/5$ radians, i.e., 75° as compared with 72°.

The numbers of turns of the coils of the winding having a number of poles of $2P_1 = 4$ and $2P_2 = 6$ can be determined similarly as for the above-described modification of the winding.

Let us consider the branch c–f. The coordinate of the axis of this branch is equal to 240° both relative to one and the other number of poles (the terminals $c$ and $f$ correspond to the 240° phase of the supply voltage).

The coordinates of the coils 19 and 39 forming this branch are as follows:
 the coordinate of the coil 19 is 25°,
 the coordinate of the coil 39 is 50°.

Relative to the field having a number of pairs of poles $P_1 = 2$, the coordinates of these coils are equal to 50 and 100 electrical degrees respectively, while relative to the field having a number of pairs of poles $P_2 = 3$ the coordinates of these coils are equal to 75 and 150 electrical degrees respectively.

Let us determine the number of turns of the coils by using the coordinates of the coils relative to the field having a number of pairs of coils $P_1=2$.

The angle between the axis of the coil 19 and the axis of the branch c–f is equal to 50°–240° =–190 electrical degrees, while between the axis of the coil 39 and the axis of the branch c–f this angle is equal to 100°–240°=–340°= 20 electrical degrees.

The number of turns of the coil 19: sin 20°/sin 75°·2 = 0.684
The number of turns of the coil 39: sin (–190°)/sin 75°·2= 0.347

With respect to the number of pairs of poles of the branch c–f this angle is equal to 75°–240° = –165 electrical degrees, while between the axis of the coil 39 and the axis of the branch c–f it is equal to –150°–240° = –390° = –30 electrical degrees.

The number of turns of the coil 19: sin (–30°)/sin 75°·3 = 0.707
The number of turns of the coils 39 sin (–165°)/sin 75°·3= 0.366.

The obtained values of effective numbers of turns correspond to a construction of the branches comprising a single coil of three sections spaced for 10 geometrical degrees (the coils 18 of the branch a–d, the coils 26 of the branch c–f, and the coils 34 of the branch b–d) and the other branches, each comprising two coils of two sections spaced from each other approximately for 10°, (for example, the coil 19 of the branch c–f) and one section spaced from the above two sections for 75° (for example, the coil 39 of the branch c–f).

Figure 3:
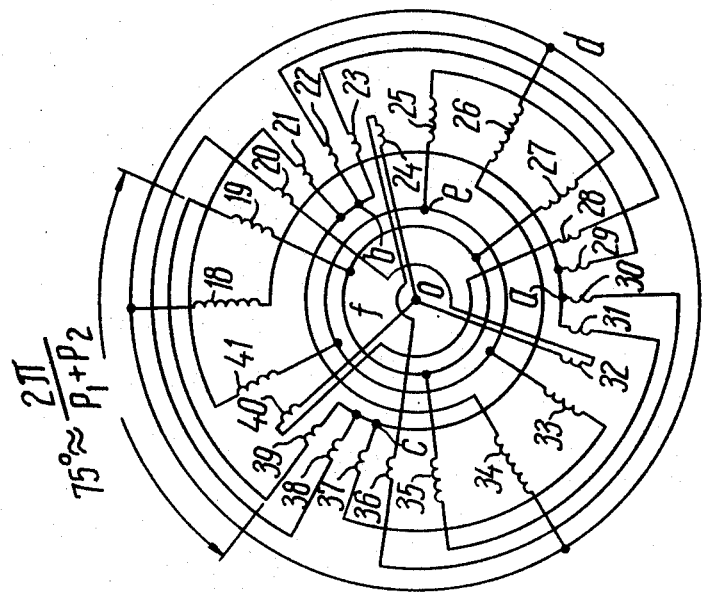
FIG. 3 shows a diagram of connection of the coils of a winding having a pole number ratio of 6:4.
Figures 4A, 4B, 4C, 4D, 4E:
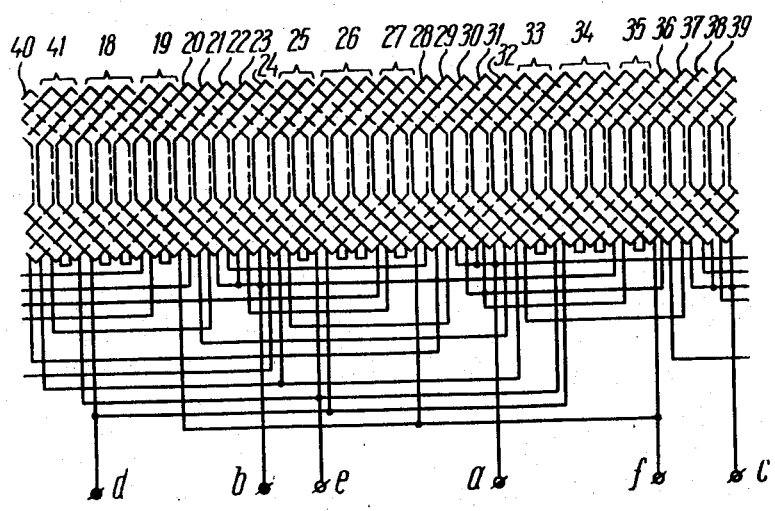
FIG. 4 shows an extended diagram of the winding having a number of pole ratio of 6:4 and diagrams of the magnetomotive force.
Figure 6:
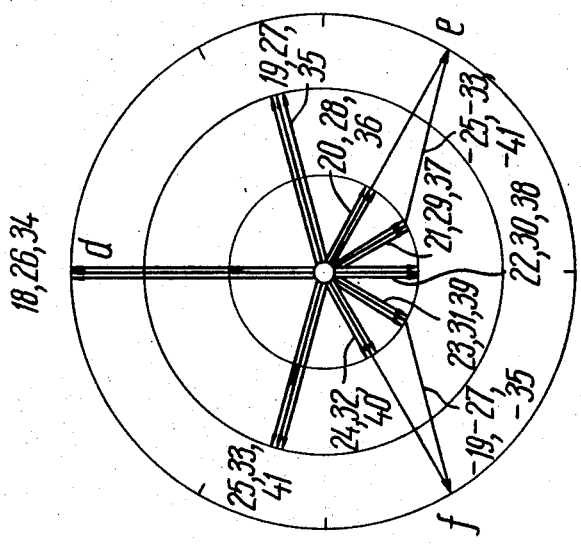
FIGS. 5,6 are vector diagrams of the electromotive force of the winding having a pole number ratio of 6:4.
Figure 5:
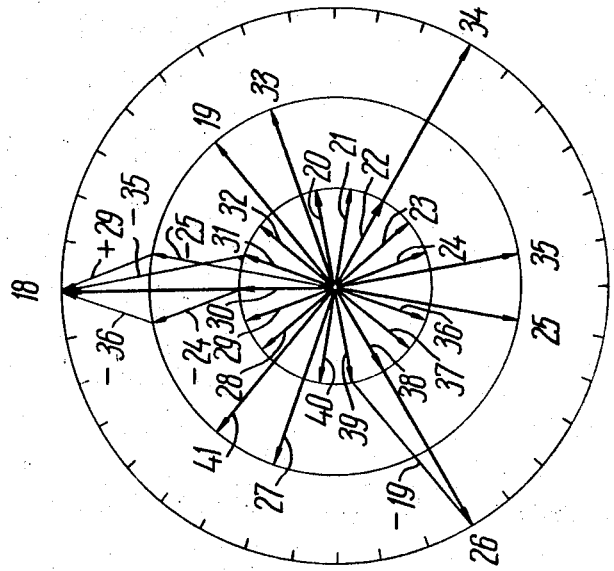

Given in FIGS. 5,6 are vector diagrams of the electromotive forces of the coils of the above winding whose diagrams are shown in FIGS. 3 and 4. As seen from these diagrams, the phase of the electromotive force induced by the rotating magnetic fields with one number of poles ($2P_1$=4) (FIG. 5) and with another number of poles ($2P_2 = 6$) (FIG. 6) in the branch c–f, comprising the coils 19 and 39, is equal to 240°.

The amplitude of the electromotive force of the coil 19 is equal to 0.684 fraction of the amplitude of the electromotive force of the whole branch c–f equal to the amplitude of the coil 18 under the action of the field having a number of poles $2P_1 = 4$ and is equal to 0.707 fraction of the amplitude of the electromotive force of the whole branch c–f under the action of the field having a number of poles $2P_2 = 6$. The same for the coil 39 is equal to 0.347 and 0.366 fractions respectively.

The electromotive forces of the parallel branches are equal both under the action of the field having one number of poles and the field having an other number of poles. Owing to this fact the windings according to the proposed invention allow supply of an alternating current thereto at both numbers of poles without inducing equalizing currents, and this makes it possible to employ such windings in pole-changing motors, frequency changers, electric machine a.c. amplifiers and other devices.

The three-phase motors equipped with the above-described windings have six terminals like the pole-changing motors built around the Dalander circuit, but the former require more simple switching equipment, similar to that required for the motors having two independent windings, because the proposed windings provide for normal operation of the motor fed through the terminals $a,b,c$ or $b,e,f$ at the opened terminals $b,e,f$ or $a,b,c$ respectively.

The use of windings having an equal number of parallel branches and an equal number of turns in the phase for both numbers of poles in pole-changing motors does not allow the facilities of the motor of the given dimensions to be used completely. It is known that at a constant moment of resistance on the shaft of an electric motor, switching to a higher rotational speed increases the input power of the motor.

This leads to an increase in the current at the same supply voltage. To eliminate overheating of the motor, the number of parallel branches in the phase needs to be increased. This is possible if the winding has additional coils 20, 22, 24, 28, 30, 32, 36, 38, 40 combined into groups depending on the number of phases of the machine and permanently connected to the winding terminals. In the motors intended for operation at a constant moment of resistance on the shaft the additional coils 24, 30, 36; 22, 28, 40; 20, 32, 38 (FIGS. 3, 4) are connected to the terminals by the lower number of poles and form additional parallel branches a–o, b–o, c–o.

Shown in FIG. 5 is a resultant electromotive force of the branch a–o comprising the additional coils 24, 30, 36 (the coils 24 and 36 are opposite connected). It is seen from the drawing that the resultant electromotive force of the additional branch (a–o) coincides by value and phase with the electromotive force of the remaining branches (a–d, a–e, a–f) of the corresponding phase of the winding. In this case the electromotive force of the additional coils 24, 30, 36 induced by the field having a number of pairs of poles of $P = 3$ at the opposite connection of the coils 24 and 36 form a symmetrical multiphase system so that the resultant of the electromotive force of the branch a–o (b–o and c–o) is zero.

In the winding of an electric motor intended for operation at constant power the additional coils 22,30,38; 20,28,36; 24,32,40 are preferably combined into groups (the branches d–d' e–e', f–f' (FIG. 7) respectively) connected to the terminals corresponding to the greater number of poles.

Figure 7:
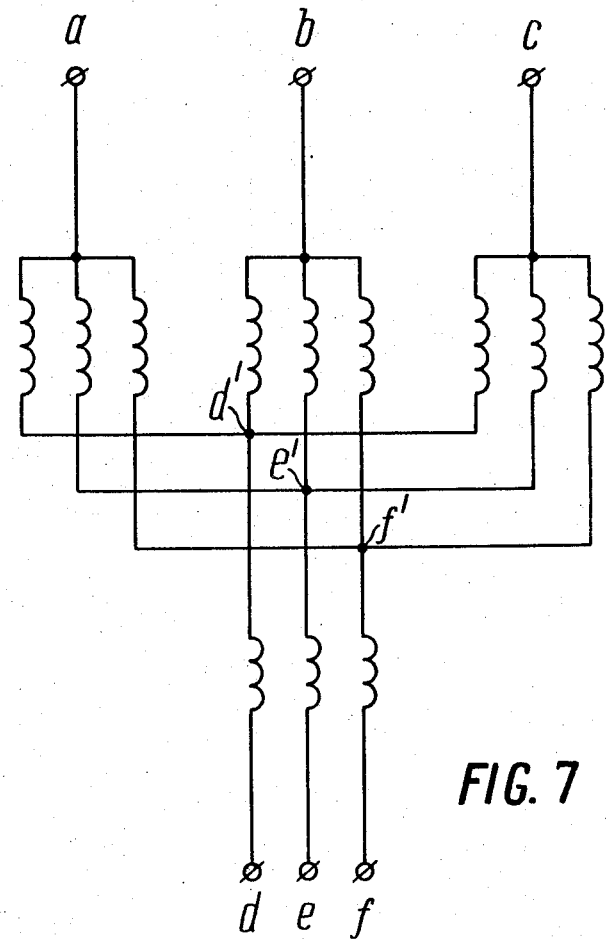
FIG. 7 shows a diagram of connection of the portions of the winding of the motor intended for operation at constant power.

In each group the electromotive force induced by the rotating field having a number of poles $P_1 = 2$ is absent, while the electromotive force induced by the field having a number of poles of $P_2 = 3$ is three times as great as the electromotive force of the winding. The branches d–d', e–e', f–f' including the additional coils 22, 30, 38; 20, 28, 36; 24, 32, 40 are preferably connected in series with the main winding as shown in FIG. 7 as at a constant power of the motor and a similar load capacity the winding should have a higher number of turns in a phase at a greater numbers of poles. In this case the additional windings 22,30,38; 20,28,36; 24,32,40 are preferably made with a higher cross section of the effective wire than that of the remaining coils.

When providing a pole-changing motor intended for operation at a constant moment of load and equipped with the above-described winding, the coils preferably have a pitch close to the diametric pitch by a higher number of poles, whereas for operation at a constant power the coils preferably have a pitch close to the diametric pitch by a lower number of poles.

The described modification of the winding having a pole-number ratio of 6:4 can be made at a number of slots multiple to 36.

When the winding is fed with an alternating current through the terminals $a,b,c$, a four-pole rotating magnetic field appears and when the winding is fed through the terminals $d,e,f$ a six-pole rotating magnetic field appears.

FIG. 4 shows diagrams 42 of the four-pole electromotive force of the winding prior to the moment of time when the current applied to the terminal $a$ has a maximum value and a diagram 43 when the current is zero, as well as a diagram 44 of the six-pole magnetomotive force at the moment of time when the current applied to the terminal $d$ has a maximum value and a diagram 45 when this current is zero.

As seen from this Figure, the curves of the magnetomotive force are close to a sinusoid and both the four-pole wave and the six-pole wave move for 90 electrical degrees during one-quarter period of the supply voltage.

We claim:

1. A winding for an alternating current electric machine having a magnetic core and a plurality of poles, comprising coils distributed along the magnetic core of the machine and forming branches $a$–$d$, $a$–$e$, $a$–$f$, $b$–$d$, $b$–$e$, $b$–$f$, $c$–$d$, $c$–$e$ and $c$–$f$ between terminals a,b,c corresponding to a first number of poles $2P_1$ and terminals $d$, $e$, $f$ corresponding to a second number of poles $2P_2$, at least one winding comprising at least two series-connected coils, whose axes form an angle which is approximately equal to $2/(P_1+P_2)$ radians, the number of turns in one of said series-connected coils being proportional to the number of effective turns of a phase comprising said series-connected coils and to the sine of the angle in electric degrees between the axis of the other of said series-connected coils and the axis of the branch comprising said series-connected coils.

2. A winding of an electric machine as claimed in claim 5, in which it is provided with additional coils combined into groups permanently connected to the terminals corresponding to the terminals of one of the numbers of poles, each group including coils spaced from each other for a distance approximately equal to an integral number of the pole divisions of the same number of poles.

3. A winding of an electric machine as claimed in claim 2, in which the groups of additional coils are connected to the terminals of a lower number of poles parallel to the winding.

4. A winding of an electric machine as claimed in claim 2, in which the groups of additional coils are connected to the terminals of a higher number of poles in series with the winding.

* * * * *